(12) United States Patent
Lee et al.

(10) Patent No.: US 9,771,846 B2
(45) Date of Patent: Sep. 26, 2017

(54) EXHAUST PURIFICATION DEVICE AND METHOD OF CALCULATING NH3 MASS GENERATED IN LEAN NOX TRAP OF EXHAUST PURIFICATION DEVICE

(71) Applicants: HYUNDAI MOTOR COMPANY, Seoul (KR); FEV GMBH, Aachen (DE)

(72) Inventors: Jin Ha Lee, Seoul (KR); Jin Woo Park, Suwon-si (KR); Joschka Schaub, Aachen (DE); Alexander Vovk, Aachen (DE); Thomas Wittka, Kornelimünster (DE)

(73) Assignees: HYUNDAI MOTOR COMPANY, Seoul (KR); FEV GMBH, Aachen (DE)

( * ) Notice: Subject to any disclaimer, the term of this patent is extended or adjusted under 35 U.S.C. 154(b) by 10 days.

(21) Appl. No.: 14/954,426

(22) Filed: Nov. 30, 2015

(65) Prior Publication Data
US 2016/0348553 A1    Dec. 1, 2016

(30) Foreign Application Priority Data
May 30, 2015 (KR) .................. 10-2015-0044460

(51) Int. Cl.
*F01N 3/00* (2006.01)
*F01N 3/08* (2006.01)
(Continued)

(52) U.S. Cl.
CPC ....... *F01N 3/0842* (2013.01); *B01D 53/9418* (2013.01); *B01D 53/9495* (2013.01);
(Continued)

(58) Field of Classification Search
USPC ......... 60/274, 276, 277, 286, 295, 297, 301, 60/303
See application file for complete search history.

(56) References Cited

U.S. PATENT DOCUMENTS

| 6,996,975 | B2* | 2/2006 | Radhamohan | ........ F01N 3/0814 60/276 |
| 7,003,944 | B2* | 2/2006 | Surnilla | ................ F01N 3/0814 60/276 |

(Continued)

FOREIGN PATENT DOCUMENTS

| JP | 2008-286102 A | 11/2008 |
| KR | 10-2009-0064061 A | 6/2009 |

(Continued)

*Primary Examiner* — Binh Q Tran
(74) *Attorney, Agent, or Firm* — McDermott Will & Emery LLP

(57) ABSTRACT

A method of calculating an ammonia (NH3) mass generated in a lean NOx trap (LNT) of an exhaust purification device includes sequentially calculating a NH3 mass flow at a downstream of each slice from a first slice to an n-th slice, and integrating the NH3 mass flow at the downstream of the n-th slice over a predetermined time, wherein the calculation of the NH3 mass flow at the downstream of the i-th slice comprises calculating a NH3 mass flow flowing into the i-th slice, calculating a NH3 mass flow generated at the i-th slice, and adding the NH3 mass flow generated at the i-th slice to a value obtained by subtracting the NH3 mass flow used to reduce the NOx and the O2 at the i-th slice from the NH3 mass flow flowing into the i-th slice.

15 Claims, 10 Drawing Sheets

(51) Int. Cl.
  *F02D 41/14*   (2006.01)
  *B01D 53/94*   (2006.01)
  *F01N 3/20*    (2006.01)
  *F01N 11/00*   (2006.01)
  *F02D 41/02*       (2006.01)
  *F01N 13/00*       (2010.01)

(52) U.S. Cl.
  CPC ......... *F01N 3/0871* (2013.01); *F01N 3/2066* (2013.01); *F01N 11/00* (2013.01); *F02D 41/1441* (2013.01); *F02D 41/1454* (2013.01); *F01N 3/2073* (2013.01); *F01N 13/009* (2014.06); *F01N 2570/14* (2013.01); *F01N 2900/0406* (2013.01); *F01N 2900/0418* (2013.01); *F01N 2900/1602* (2013.01); *F01N 2900/1614* (2013.01); *F02D 41/0275* (2013.01); *F02D 41/146* (2013.01); *F02D 41/1446* (2013.01); *F02D 41/1448* (2013.01); *F02D 2041/1433* (2013.01)

(56) References Cited

U.S. PATENT DOCUMENTS

| | | | |
|---|---|---|---|
| 2003/0070419 A1* | 4/2003 | Kako | F01N 3/0842 60/274 |
| 2011/0293483 A1* | 12/2011 | Tanoura | F01N 3/0821 422/111 |
| 2013/0064717 A1* | 3/2013 | Masaki | F01N 3/208 422/108 |
| 2013/0247543 A1* | 9/2013 | Hirota | F01N 3/208 60/274 |

FOREIGN PATENT DOCUMENTS

| | | |
|---|---|---|
| KR | 10-2012-0060372 A | 6/2012 |
| KR | 10-2012-0060633 A | 6/2012 |

\* cited by examiner

EXHAUST PURIFICATION DEVICE AND METHOD OF CALCULATING NH3 MASS GENERATED IN LEAN NOX TRAP OF EXHAUST PURIFICATION DEVICE

CROSS-REFERENCE TO RELATED APPLICATION

This application claims the benefit of priority to Korean Patent Application No. 10-2015-0044460, filed with the Korean Intellectual Property Office on Mar. 30, 2015, the entire contents of which are incorporated herein by reference.

TECHNICAL FIELD

The present disclosure relates to a method of calculating an ammonia (NH3) mass generated in a lean NOx trap (LNT) of an exhaust purification device and the exhaust purification device. More particularly, the present disclosure relates to a method of calculating a NH3 mass generated in a lean NOx trap of an exhaust purification device and the exhaust purification device that improves a purification efficiency of NOx and fuel efficiency by precisely calculating the NH3 mass generated in the LNT.

BACKGROUND

Generally, exhaust gas flowing out from an engine through an exhaust manifold is driven into a catalytic converter mounted at an exhaust pipe and is purified therein. After that, noise of the exhaust gas is decreased while passing through a muffler and then the exhaust gas is emitted into the air through a tail pipe. The catalytic converter purifies pollutants contained in the exhaust gas. In addition, a particulate filter for trapping particulate matter (PM) contained in the exhaust gas is mounted in the exhaust pipe.

A denitrification catalyst (DeNOx catalyst) is one type of such a catalytic converter, and purifies nitrogen oxide (NOx) contained in the exhaust gas. If reducing agents such as urea, ammonia, carbon monoxide, and a hydrocarbon (HC) are supplied to the exhaust gas, the NOx contained in the exhaust gas is reduced in the DeNOx catalyst through oxidation-reduction reactions with the reducing agents.

Recently, a lean NOx trap (LNT) catalyst has been used as such a DeNOx catalyst. The LNT catalyst adsorbs the NOx contained in the exhaust gas when an air/fuel ratio is lean, and releases the adsorbed NOx and reduces the released nitrogen oxide and the nitrogen oxide contained in the exhaust gas when the air/fuel ratio is rich.

Since general diesel engines are operated at the lean air/fuel ratio, however, it is required to artificially adjust the air/fuel ratio to be the rich air/fuel ratio (hereinafter, it will be called a 'regeneration of the LNT') in order to release the adsorbed NOx from the LNT.

At this time, a part of the NH3 flowing into the LNT and the NH3 generated in the LNT slips from the LNT, and the slipped NH3 can be used as a reducing agent in a selective catalytic reduction (SCR) catalyst. Therefore, if a NH3 mass that slips from the LNT in regeneration is calculated precisely, a mass of the reducing agent that should be injected by a dosing module to be supplied into the SCR catalyst can be precisely calculated.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide a method of calculating an ammonia (NH3) mass generated in a lean NOx trap (LNT) of an exhaust purification device and the exhaust purification device having advantages of improving NOx purification efficiency and fuel economy by precisely calculating a NH3 mass generated in (or slipped from) the LNT.

In addition, another embodiment of the present disclosure provides an exhaust purification device that can precisely calculate a mass of a reducing agent that should be injected by a dosing module by precisely calculating the NH3 mass generated in the LNT.

A method of calculating an ammonia (NH3) mass generated in a lean NOx trap (LNT) of an exhaust purification device according to an exemplary embodiment of the present disclosure will be described in detail.

The LNT may be divided into n slices along a flow of an exhaust gas.

The method may include: sequentially calculating a NH3 mass flow at a downstream of each slice from a first slice to an n-th slice; and integrating the NH3 mass flow at the downstream of the n-th slice over predetermined time.

The calculation of the NH3 mass flow at the downstream of the i-th slice may include: calculating a NH3 mass flow flowing into the i-th slice; calculating a NH3 mass flow flowing into the i-th slice; calculating a NH3 mass flow generated at the i-th slice; and adding the NH3 mass flow generated at the i-th slice to a value obtained by subtracting the NH3 mass flow used to reduce the NOx and the O2 at the i-th slice from the NH3 mass flow flowing into the i-th slice.

The NH3 mass flow flowing into the i-th slice may be the NH3 mass flow at the downstream of the (i−1)-th slice.

The calculation of the NH3 mass flow used to reduce the NOx and the O2 at the i-th slice may include: calculating the NH3 mass flow at an upstream of the i-th slice; calculating a NH3 usage ratio according to a temperature of the i-th slice and a ratio of a NOx adsorption at the i-th slice to a NOx adsorption at the LNT; calculating a correction coefficient according to the temperature of the i-th slice and a mass flow of the exhaust gas passing through the i-th slice; calculating a correction coefficient according to an aging factor of the i-th slice; calculating a correction coefficient according to a ratio of the adsorbed O2 and NOx; and calculating the NH3 mass flow used to reduce the NOx and the NH3 mass flow used to reduce the O2 at the i-th slice on the basis of the NH3 mass flow at the upstream of the i-th slice, the NH3 usage ratio according to the temperature of the i-th slice and the ratio of the NOx adsorption at the i-th slice to the NOx adsorption at the LNT, the correction coefficient according to the temperature of the i-th slice and the mass flow of the exhaust gas passing through the i-th slice, the correction coefficient according to the aging factor of the i-th slice, and the correction coefficient according to the ratio of the adsorbed O2 and NOx.

The calculation of the NH3 mass flow generated at the i-th slice may include: calculating a mass flow of a reductant other than NH3 used to reduce the NOx at the i-th slice; calculating a NH3 generation coefficient at the i-th slice; and calculating the NH3 mass flow generated at the i-th slice on the basis of the mass flow of the reductant other than NH3 used to reduce the NOx at the i-th slice and the NH3 generation coefficient at the i-th slice.

The calculation of the NH3 generation coefficient at the i-th slice may include: calculating a base NH3 generation coefficient on the basis of a rich progress rate and the temperature of the i-th slice; calculating a correction coefficient according to a NOx adsorption and the temperature of the i-th slice; calculating a correction coefficient according to the temperature of the i-th slice and the mass flow of the exhaust gas passing through the i-th slice; calculating a correction coefficient according to a lambda at an upstream of the LNT and the temperature of the i-th slice; calculating a correction coefficient according to the aging factor of the i-th slice; calculating a correction coefficient according to a ratio of CO and HC contained in the reductant other than the NH3; and calculating a corrected NH3 generation coefficient at the i-th slice on the basis of the base NH3 generation coefficient according to the rich progress rate and the temperature of the i-th slice, the correction coefficient according to the NOx adsorption and the temperature of the i-th slice, the correction coefficient according to the temperature of the i-th slice and the mass flow of the exhaust gas passing through the i-th slice, the correction coefficient according to the lambda at the upstream of the LNT and the temperature of the i-th slice, the correction coefficient according to the aging factor of the i-th slice, and the correction coefficient according to the ratio of CO and HC contained in the reductant other than the NH3.

The rich progress rate may be defined as an equation of $$\frac{1 - \lambda_{downstream}}{\lambda_{upstream}} \bigg/ \frac{1 - \lambda_{target}}{\lambda_{target}},$$

wherein, $\lambda_{target}$ is a target lambda, $\lambda_{upstream}$ is the lambda at the upstream of the LNT, and $\lambda_{downstream}$ is a lambda at a downstream of the LNT.

The mass flow of the reductant other than the NH3 used to reduce the NOx at the i-th slice may be calculated through a model where C3H6 represents all reductant besides NH3 as a kind of substitute reductant.

An exhaust purification device according to another exemplary embodiment of the present disclosure may include: an engine including an injector for injecting fuel thereinto, generating power by burning mixture of air and the fuel, and exhausting the exhaust gas generated at combustion process to the exterior thereof through an exhaust pipe; a lean NOx trap (LNT) mounted on the exhaust pipe, and configured to adsorb nitrogen oxide (NOx) contained in the exhaust gas at a lean air/fuel ratio, to release the adsorbed nitrogen oxide at a rich air/fuel ratio, and to reduce the nitrogen oxide contained in the exhaust gas or the released nitrogen oxide using reductant including carbon or hydrogen contained in the exhaust gas; and a controller configured to control adsorption and release of the NOx by controlling air/fuel ratio according to the NOx adsorbed in the LNT and a temperature of the exhaust gas, wherein the LNT is divided into n slices along a flow of the exhaust gas, and wherein the controller sequentially calculates a NH3 mass flow at a downstream of each slice from a first slice to an n-th slice, and calculates a NH3 mass generated in the LNT by integrating the NH3 mass flow at the downstream of the n-th slice over a predetermined time.

The controller may calculate a NH3 mass flow flowing into the i-th slice, a NH3 mass flow used to reduce NOx and O2 at the i-th slice, and a NH3 mass flow generated at the i-th slice, and may calculate the NH3 mass flow at the downstream of the i-th slice by adding the NH3 mass flow generated at the i-th slice to a value obtained by subtracting the NH3 mass flow used to reduce the NOx and the O2 at the i-th slice from the NH3 mass flow flowing into the i-th slice.

The controller may calculate the NH3 mass flow at the downstream of the (i−1)-th slice as the NH3 mass flow flowing into the i-th slice.

The controller may calculate the NH3 mass flow used to reduce the NOx and the NH3 mass flow used to reduce the O2 at the i-th slice on the basis of a NH3 mass flow at an upstream of the i-th slice, a NH3 usage ratio according to a temperature of the i-th slice and a ratio of a NOx adsorption at the i-th slice to a NOx adsorption at the LNT, a correction coefficient according to the temperature of the i-th slice and a mass flow of the exhaust gas passing through the i-th slice, a correction coefficient according to an aging factor of the i-th slice, and a correction coefficient according to a ratio of adsorbed O2 and NOx.

The controller may calculate the NH3 mass flow generated at the i-th slice on the basis of a mass flow of a reductant other than the NH3 used to reduce the NOx at the i-th slice and a NH3 generation coefficient at the i-th slice.

The controller may calculate a corrected NH3 generation coefficient at the i-th slice on the basis of a base NH3 generation coefficient according to the rich progress rate and the temperature of the i-th slice, a correction coefficient according to a NOx adsorption and the temperature of the i-th slice, a correction coefficient according to the temperature of the i-th slice and the mass flow of the exhaust gas passing through the i-th slice, a correction coefficient according to a lambda at an upstream of the LNT and the temperature of the i-th slice, a correction coefficient according to an aging factor of the i-th slice, and a correction coefficient according to a ratio of CO and HC contained in the reductant other than NH3.

The rich progress rate may be defined as an equation of $$\frac{1 - \lambda_{downstream}}{\lambda_{upstream}} \bigg/ \frac{1 - \lambda_{target}}{\lambda_{target}},$$

wherein, $\lambda_{target}$ is a target lambda, $\lambda_{upstream}$ is the lambda at the upstream of the LNT, and $\lambda_{downstream}$ is a lambda at a downstream of the LNT.

The controller may calculate the mass flow of the reductant other than the NH3 used to reduce the NOx at the i-th slice through a model where C3H6 represents all reductant besides the NH3 as a kind of substitute reductant.

The exhaust purification device may further include: a dosing module mounted at the exhaust pipe downstream of the LNT and configured to directly inject reducing agent into the exhaust gas; and a selective catalytic reduction (SCR) catalyst mounted at the exhaust pipe downstream of the dosing module and configured to reduce the NOx contained in the exhaust gas by using the reducing agent injected by the dosing module, wherein the controller is configured to control an amount of the reducing agent injected by the dosing module according to a NOx mass flow flowing into the SCR catalyst, and wherein the controller is configured to control the amount of the reducing agent injected by the dosing module considering the NH3 mass generated at the LNT.

As described above, consumption of a reducing agent injected into an SCR catalyst may be reduced by precisely calculating a NH3 mass generated in an LNT.

In addition, since the NH3 mass generated in the LNT is precisely calculated, a NOx mass remaining in the LNT may be precisely predicted. Therefore, a timing for regenerating the LNT is precisely determined and thereby, improving fuel economy.

Further, since a reaction model is set by assuming that only the NH3 and the C3H6 are reductants used in LNT and only the NO2 is the NOx reduced in the LNT, a memory may be reduced and a control process may be simplified.

In addition, even though the reaction model is simplified, suitable prediction results may be obtained.

DETAILED DESCRIPTION

Exemplary embodiments of the present disclosure will hereinafter be described in detail with reference to the accompanying drawings.

Figure 1:
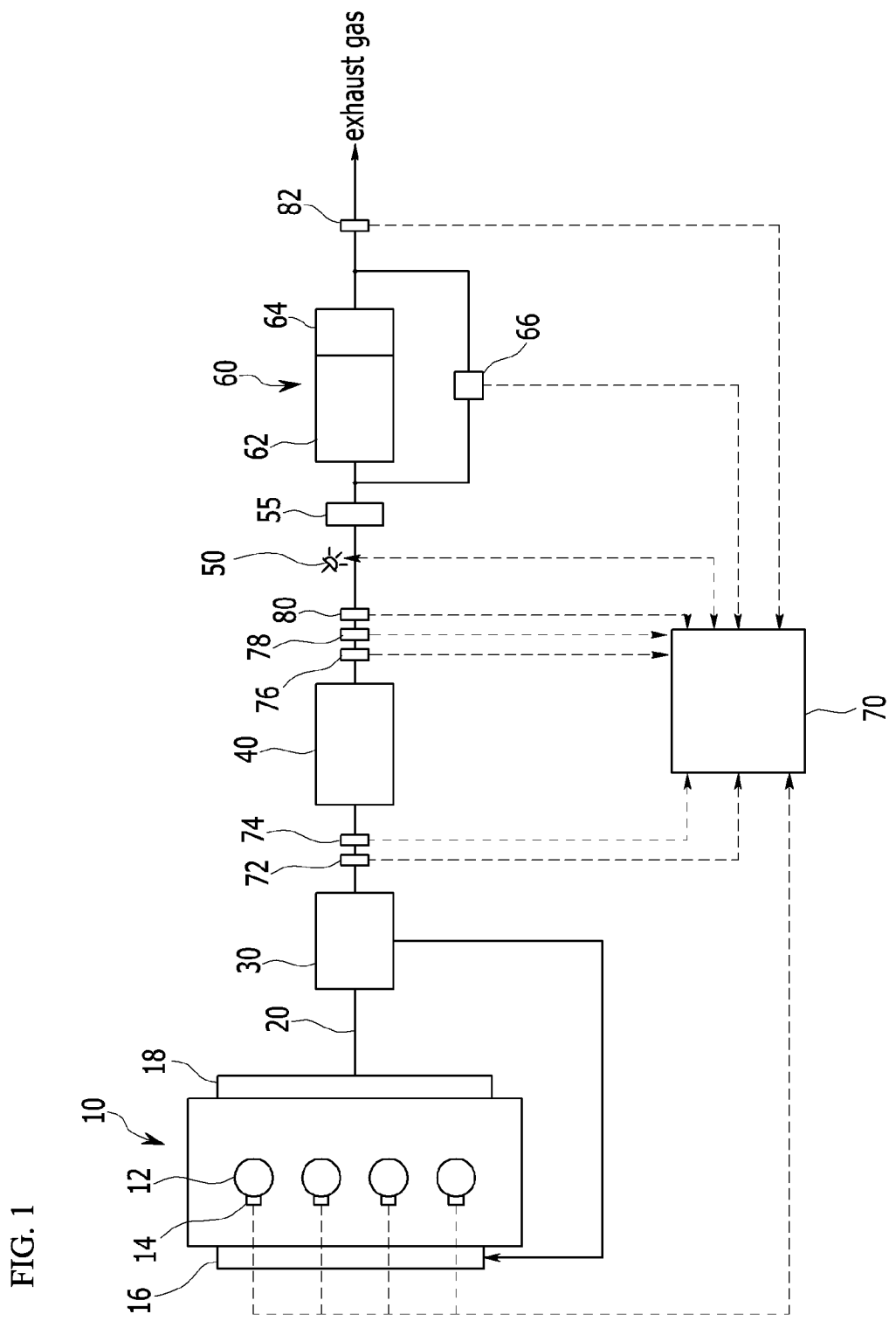
FIG. 1 is a schematic diagram of an exhaust purification device according to an exemplary embodiment of the present disclosure.

FIG. 1 is a schematic diagram of an exhaust purification device according to an exemplary embodiment of the present disclosure.

As shown in FIG. 1, an exhaust system for an internal combustion engine may include an engine 10, an exhaust pipe 20, an exhaust gas recirculation (EGR) apparatus 30, a lean NOx trap (LNT) 40, a dosing module 50, a particulate filter 60, and a controller 70.

The engine 10 burns an air/fuel mixture in which fuel and air are mixed so as to convert chemical energy into mechanical energy. The engine 10 is connected to an intake manifold 16 so as to receive the air in a combustion chamber 12, and is connected to an exhaust manifold 18 such that exhaust gas generated in a combustion process is gathered in the exhaust manifold 18 and is exhausted to the exterior. An injector 14 is mounted in the combustion chamber 12 so as to inject the fuel into the combustion chamber 12.

A diesel engine is exemplified herein, but a lean-burn gasoline engine may be used. In a case that the gasoline engine is used, the air/fuel mixture flows into the combustion chamber 12 through the intake manifold 16, and a spark plug (not shown) is mounted at an upper portion of the combustion chamber 12. In addition, if a gasoline direct injection (GDI) engine is used, the injector 14 is mounted at the upper portion of the combustion chamber 12.

The exhaust pipe 20 is connected to the exhaust manifold 18 so as to exhaust the exhaust gas to the exterior of a vehicle. The LNT 40, the dosing module 50, and the particulate filter 60 are mounted on the exhaust pipe 20 so as to remove a hydrocarbon, carbon monoxide, particulate matter, and nitrogen oxide (NOx) contained in the exhaust gas.

The exhaust gas recirculation apparatus 30 is mounted on the exhaust pipe 20, and a portion of the exhaust gas exhausted from the engine 10 may be supplied back to the engine 10 through the exhaust gas recirculation apparatus 30. In addition, the exhaust gas recirculation apparatus 30 is connected to the intake manifold 16 so as to control combustion temperature by mixing a portion of the exhaust gas with the air. Such control of the combustion temperature is performed by controlling an amount of the exhaust gas supplied back to the intake manifold 16 by control of the controller 70. Therefore, a recirculation valve (not shown) controlled by the controller 70 may be mounted on a line connecting the exhaust gas recirculation apparatus 30 and the intake manifold 16.

A first oxygen sensor 72 may be mounted on the exhaust pipe 20 downstream of the exhaust gas recirculation apparatus 30. The first oxygen sensor 72 detects an oxygen amount in the exhaust gas passing through the exhaust gas recirculation apparatus 30 and transmits a signal corresponding thereto to the controller 70 so as to help lean/rich control of the exhaust gas performed by the controller 70. In this specification, the detected value by the first oxygen sensor 72 is called a lambda ($\lambda_{upstream}$) at an upstream of the LNT.

In addition, a first temperature sensor 74 may be mounted on the exhaust pipe 20 downstream of the exhaust gas recirculation apparatus 30 and detects a temperature of the exhaust gas passing through the exhaust gas recirculation apparatus 30.

The LNT 40 is mounted on the exhaust pipe 20 downstream of the exhaust gas recirculation apparatus 30. The LNT 40 adsorbs the nitrogen oxide (NOx) contained in the exhaust gas at a lean air/fuel ratio, and releases the adsorbed nitrogen oxide and reduces the nitrogen oxide contained in the exhaust gas or the released nitrogen oxide at a rich air/fuel ratio. In addition, the LNT 40 may oxidize carbon monoxide (CO) and a hydrocarbon (HC) contained in the exhaust gas. In this specification, releasing the NOx adsorbed in the LNT 40 by making the rich air/fuel ratio will be called a 'regeneration of the LNT'.

Herein, the hydrocarbon represents all compounds consisting of carbon and hydrogen contained in the exhaust gas and the fuel.

A second oxygen sensor 76, a second temperature sensor 78, and a first NOx sensor 80 may be mounted on the exhaust pipe 20 downstream of the LNT 40.

The second oxygen sensor 76 detects an oxygen amount contained in exhaust gas flowing into the particulate filter 60 and transmits a signal corresponding thereto to the controller 70. The controller 70 may perform the lean/rich control of the exhaust gas based on the detected values by the first oxygen sensor 72 and the second oxygen sensor 76. In this specification, the detected value by the second oxygen sensor 62 is called a lambda ($\lambda_{downstream}$) at a downstream of the LNT.

The second temperature sensor 78 detects a temperature of the exhaust gas flowing into the particulate filter 60 and transmits a signal corresponding thereto to the controller 70.

The first NOx sensor 80 detects a NOx concentration contained in the exhaust gas flowing into the particulate filter 60 and transmits a signal corresponding thereto to the controller 70. The NOx amount detected by the first NOx sensor 80 may be used to determine an amount of a reducing agent injected by the dosing module 50.

The dosing module 50 may be mounted on the exhaust pipe 20 upstream of the particulate filter 60 and may inject the reducing agent into the exhaust gas by control of the controller 70. Typically, the dosing module 50 injects urea and the injected urea is hydrolyzed and converted into ammonia. However, the reducing agent is not limited to the ammonia.

A mixer 55 is mounted on the exhaust pipe 20 downstream of the dosing module 50 and mixes the reducing agent and the exhaust gas evenly.

The particulate filter 60 is mounted on the exhaust pipe downstream of the mixer 55, traps particulate matter contained in the exhaust gas, and reduces the nitrogen oxide contained in the exhaust gas using the reducing agent injected by the dosing module 50. For these purposes, the particulate filter 60 includes a selective catalytic reduction catalyst on a diesel particulate filter (SDPF) 62 and an additional selective catalytic reduction (SCR) catalyst 64, but is not limited thereto.

It is to be understood that an SCR catalyst in this specification and claim set includes the SCR catalyst itself or the SDPF.

The SDPF 62 may be formed by coating the SCR on walls defining channels of the DPF. Generally, the DPF includes a plurality of inlet channels and outlet channels. Each of the inlet channels includes an end that is open and an other end that is blocked, and receives the exhaust gas from a front end of the DPF. In addition, each of the outlet channels includes an end that is blocked and an other end that is open, and discharges the exhaust gas from the DPF. The exhaust gas flowing into the DPF through the inlet channels enters the outlet channels through porous walls separating the inlet channels and the outlet channels. After that, the exhaust gas is discharged from the DPF through the outlet channels. When the exhaust gas passes through the porous walls, the particulate matter contained in the exhaust gas is trapped. In addition, the SCR catalyst coated on the SDPF 62 reduces the nitrogen oxide contained in the exhaust gas using the reducing agent injected by the dosing module 50.

The additional SCR catalyst 64 is mounted at a rear of the SDPF 62. The additional SCR catalyst 64 further reduces the nitrogen oxide if the SDPF 62 purifies the nitrogen oxide completely. The additional SCR catalyst 64 may be mounted physically apart from the SDPF 62.

Meanwhile, a pressure difference sensor 66 is mounted on the exhaust pipe 20. The pressure difference sensor 66 detects a pressure difference between a front end portion and a rear end portion of the particulate filter 60, and transmits a signal corresponding thereto to the controller 70. The controller 70 may control the particulate filter 60 to be regenerated if the pressure difference detected by the pressure difference sensor 66 is greater than a predetermined pressure. In this case, the injector 14 post-injects the fuel so as to burn the particulate matter trapped in the particulate filter 60.

In addition, a second NOx sensor 82 may be mounted on the exhaust pipe 20 downstream of the particulate filter 60. The second NOx sensor 82 detects a concentration of the nitrogen oxide contained in the exhaust gas exhausted from the particulate filter 60, and transmits a signal corresponding thereto to the controller 70. The controller 70 can check, based on the detected value by the second NOx sensor 82, whether the nitrogen oxide contained in the exhaust gas is normally removed in the particulate filter 60. That is, the second NOx sensor 82 may be used to evaluate performance of the particulate filter 60.

The controller 70 determines a driving condition of the engine based on the signals transmitted from each sensor, and performs the lean/rich control and controls the amount of the reducing agent injected by the dosing module 50 based on the driving condition of the engine. For example, the controller 70 may remove nitrogen oxide from the LNT 40 (in this specification, it will be called the 'regeneration of the LNT') by controlling the air/fuel ratio to be rich, and may remove nitrogen oxide from the SDPF 60 by injecting a reducing agent. The lean/rich control may be performed by controlling a fuel amount injected by the injector 14.

The controller 70 is provided with a plurality of maps and a plurality of models defining characteristics of the LNT, and may calculate a NH3 mass generated in the LNT based thereon. The plurality of maps and models may be set through a number of experiments, or existing data.

In addition, the controller 70 controls regeneration of the particulate filter 60 and desulfurization of the LNT 40.

For these purposes, the controller 70 can be realized by one or more processors activated by a predetermined program, and the predetermined program can be programmed to perform each step of a method of calculating the NH3 mass generated in the LNT according to an exemplary embodiment of the present disclosure.

Figure 2:
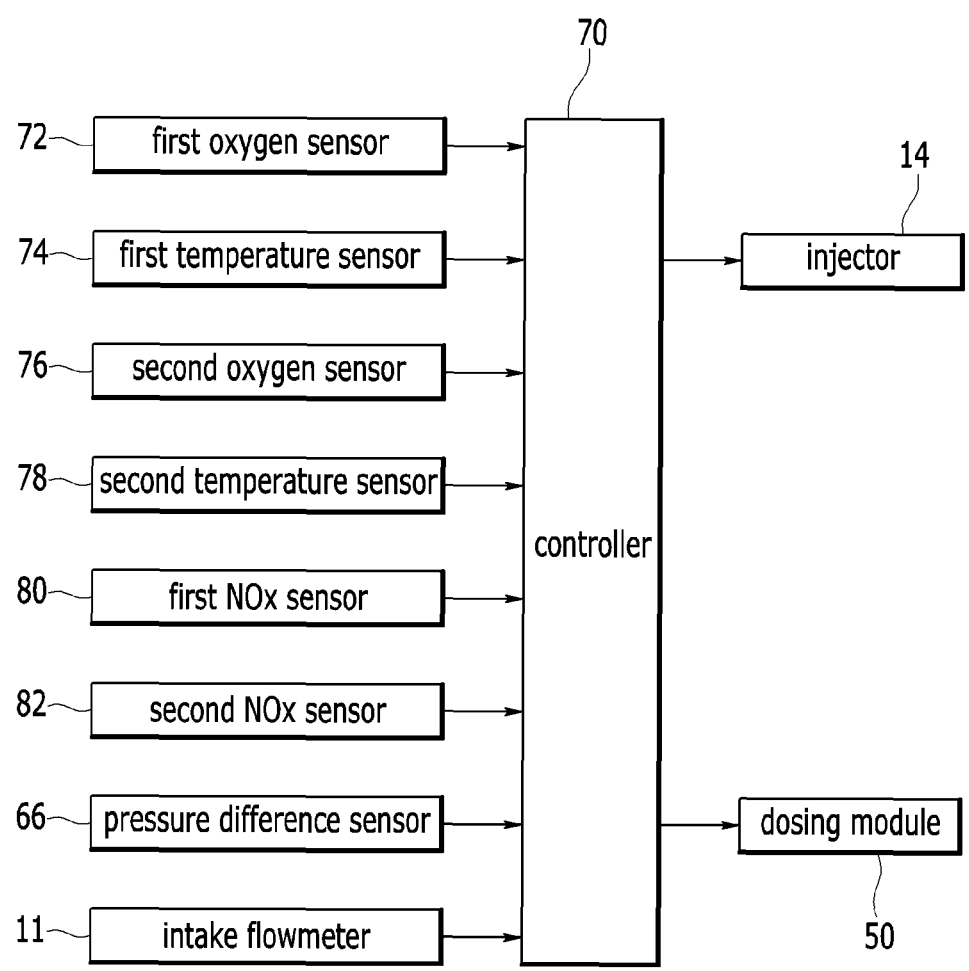
FIG. 2 is a block diagram illustrating a relationship of an input and output of a controller used in a method of calculating a NH3 mass generated in an LNT of an exhaust purification device according to an exemplary embodiment of the present disclosure.

FIG. 2 is a block diagram illustrating a relationship of an input and output of a controller used in a method of calculating a NH3 mass generated in an LNT of an exhaust purification device according to an exemplary embodiment of the present disclosure.

As shown in FIG. 2, the first oxygen sensor 72, the first temperature sensor 74, the second oxygen sensor 76, the second temperature sensor 78, the first NOx sensor 80, the second NOx sensor 82, the pressure difference sensor 66 and an intake flowmeter 11 may be electrically connected to the controller 70, and transmit the detected values to the controller 70.

The first oxygen sensor 72 detects the oxygen amount in the exhaust gas passing through the exhaust gas recirculation apparatus 30 and transmits the signal corresponding thereto to the controller 70. The controller 70 may perform the lean/rich control of the exhaust gas based on the oxygen amount in the exhaust gas detected by the first oxygen sensor 72. The detected value by the first oxygen sensor 72 may be represented as an upstream lambda ($\lambda_{upstream}$). The lambda means a ratio of actual air/fuel ratio to stoichiometric air/fuel ratio. If the lambda is greater than 1, the air/fuel ratio is lean. On the contrary, the air/fuel ratio is rich if the lambda is smaller than 1.

The first temperature sensor 74 detects a temperature of the exhaust gas passing through the exhaust gas recirculation apparatus 30 and transmits a signal corresponding thereto to the controller 70.

The second oxygen sensor 76 detects an oxygen amount in the exhaust gas flowing into the particulate filter 60 and transmits a signal corresponding thereto to the controller 70. The detected value by the second oxygen sensor 76 may be represented as a downstream lambda ($\lambda_{downstream}$). The controller 70 performs the regeneration of the LNT using the upstream lambda and the downstream lambda.

The second temperature sensor 78 detects a temperature of the exhaust gas flowing into the particulate filter 60 and transmits a signal corresponding thereto to the controller 70.

The first NOx sensor 80 detects a NOx concentration contained in the exhaust gas flowing into the particulate filter 60 and transmits a signal corresponding thereto to the controller 70.

The second NOx sensor 82 detects a NOx concentration contained in the exhaust gas exhausted from the particulate filter 60 and transmits a signal corresponding thereto to the controller 70.

The pressure difference sensor 66 detects a pressure difference between a front end portion and a rear end portion of the particulate filter 60 and transmits a signal corresponding thereto to the controller 70.

The intake flowmeter 11 detects an intake air flow supplied to an intake system of the engine 10 and transmits a signal corresponding thereto to the controller 70.

The controller 70 determines a driving condition of the engine, fuel injection amount, fuel injection timing, fuel injection pattern, injection amount of the reducing agent, regeneration timing of the particulate filter 60, and desulfurization/regeneration timing of the LNT 40 based on the transmitted value, and outputs a signal for controlling the injector 14 and the dosing module 50 to the injector 14 and the dosing module 50. In addition, the controller 70 calculates the NH3 mass generated in the LNT 40 on the basis of the transmitted value.

Meanwhile, a plurality of sensors other than the sensors illustrated in FIG. 2 may be mounted in the exhaust purification device according to the exemplary embodiment of the present disclosure. For better comprehension and ease of description, however, a description of the plurality of sensors will be omitted.

Hereinafter, referring to FIG. 4 through FIG. 10, a method of calculating the NH3 mass generated in the LNT according to an exemplary embodiment of the present disclosure will be described in detail.

FIG. 4 to FIG. 10 are flowcharts of a method of calculating NH3 mass generated in an LNT of an exhaust purification device according to an exemplary embodiment of the present disclosure.

Figure 3:
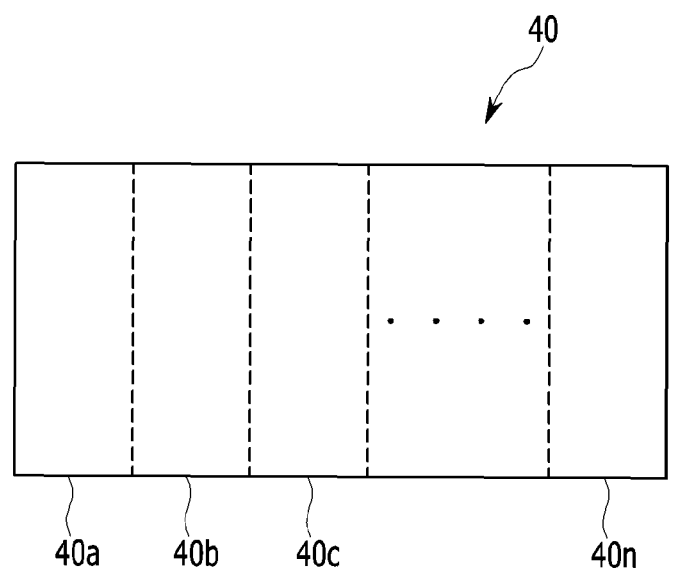
FIG. 3 is a schematic diagram of an LNT according to an exemplary embodiment of the present disclosure.

In order to perform a method of calculating the NH3 mass generated in the LNT according to an exemplary embodiment of the present disclosure, the controller 70, as shown in FIG. 3, separates and identifies the LNT 40 as n slices. That is, the LNT 40 is divided into n slices 40a, 40b, . . . , and 40n from a first slice 40a to n-th slice 40n. The n slices 40a, 40b, . . . , and 40n are sequentially disposed along a flow of the exhaust gas and are physically or virtually separated.

Figure 4:
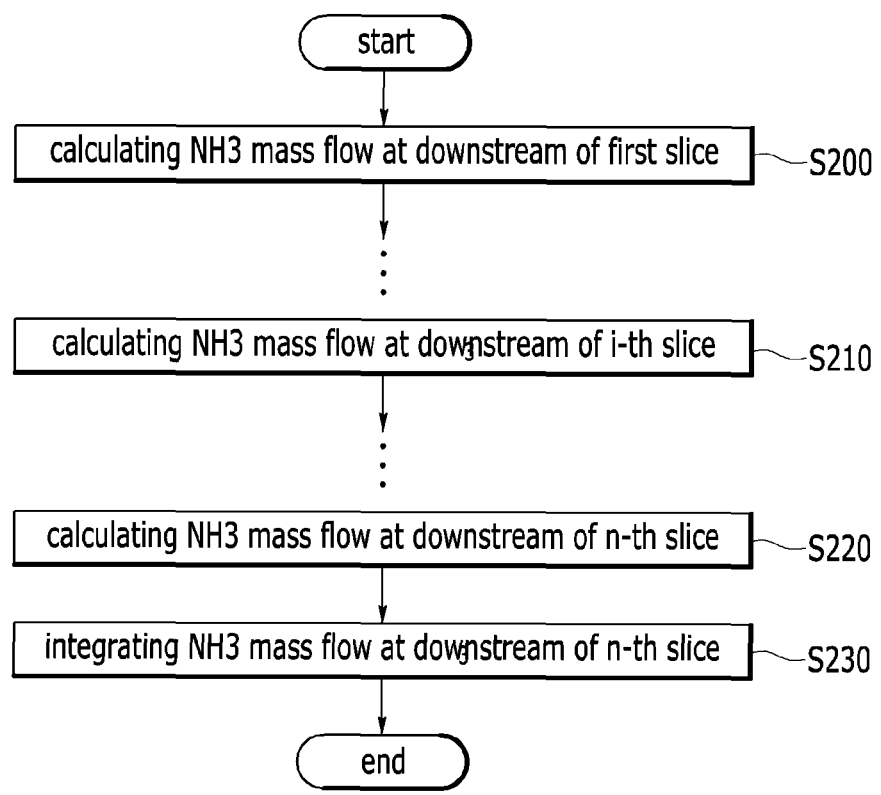
FIG. 4 through FIG. 10 are flowcharts of a method of calculating NH3 mass generated in an LNT of an exhaust purification device according to an exemplary embodiment of the present disclosure.

As shown in FIG. 4, the method of calculating the NH3 mass generated in the LNT according to the exemplary embodiment of the present disclosure begins with calculating a NH3 mass flow at a downstream of the first slice 40a at step S200. That is, the controller 70 calculates the NH3 mass flow at the downstream of the first slice 40a by adding a NH3 mass flow generated at the first slice 40a to a value obtained by subtracting a NH3 mass flow used in reduction reaction at the first slice 40a from a NH3 mass flow flowing into the first slice 40a. Since the NH3 is not contained in the exhaust gas produced in the engine 10, the NH3 is not supplied to the LNT 40. Therefore, the NH3 mass flow flowing into the first slice 40a is zero.

In the same way, the controller 70 sequentially calculates NH3 mass flows at the downstream of the second slice 40b, . . . , i-th slice 40i, . . . , and n-th slice 40n at steps S210 and S220.

After that, the controller 70 calculates the NH3 mass generated in the NH3 mass by integrating the NH3 mass flow at the downstream of the n-th slice 40a over a predetermined time at step S230. Herein, a mass flow means a mass per unit time. The mass is calculated by integrating the mass flow over a time.

Hereinafter, the NH3 mass flow of the NH3 mass flow at the downstream of the i-th slice 40i at the step S210 will be described in detail with reference to FIG. 5.

Figure 5:
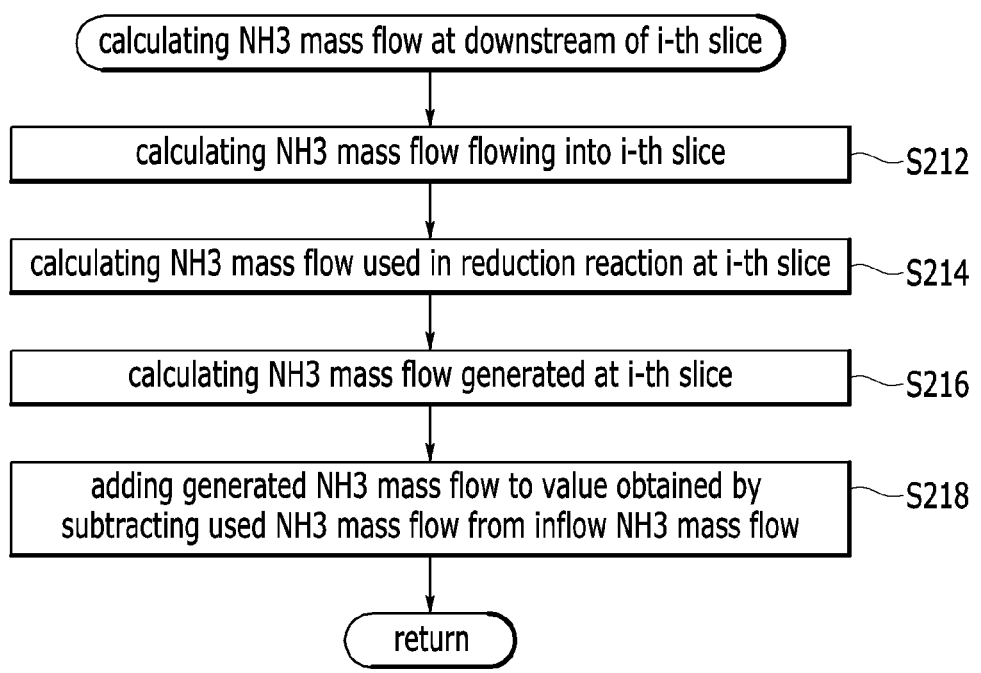

As shown in FIG. 5, the controller 70 calculates the NH3 mass flow flowing into the i-th slice 40i at step S212. Herein, the NH3 mass flow flowing into the i-th slice 40i may be the NH3 mass flow at the downstream of the (i−1)-th slice. That is, it is assumed that the NH3 at the downstream of the (i−1)-th slice flows into the i-th slice without generation/extinction. In addition, as described above, since the NH3 does not flow into the LNT 40, the NH3 mass flow flowing into the first slice 40i is zero.

After that, the controller 70 calculates the NH3 mass flow used to reduce the NOx at the i-th slice 40i at step S214. The NH3 mass flow used in the reduction reaction at the i-th slice 40i is calculated by subtracting a NH3 mass flow that is not used in the reduction reaction at the i-th slice 40i from a NH3 mass flow at an upstream of the i-th slice 40i.

In addition, the controller 70 calculates the NH3 mass flow generated at the i-th slice 40i at step S216. The NH3 mass flow generated at the i-th slice 40i is calculated by multiplying a NH3 generation coefficient to a mass flow of a reductant other than the NH3 used to reduce the NOx at the i-th slice 40i.

After that, the controller 70 calculates the NH3 mass flow at the downstream of the i-th slice 40i at step S218 by adding the NH3 mass flow generated at the i-th slice 40i to the value obtained by subtracting the NH3 mass flow used in a reduction reaction at the i-th slice 40i from the NH3 mass flow flowing into the i-th slice 40i.

Hereinafter, referring to FIG. 6, a calculation of the NH3 mass flow at the downstream of the i-th slice 40i at the step S210 will be described in detail.

Figure 6:
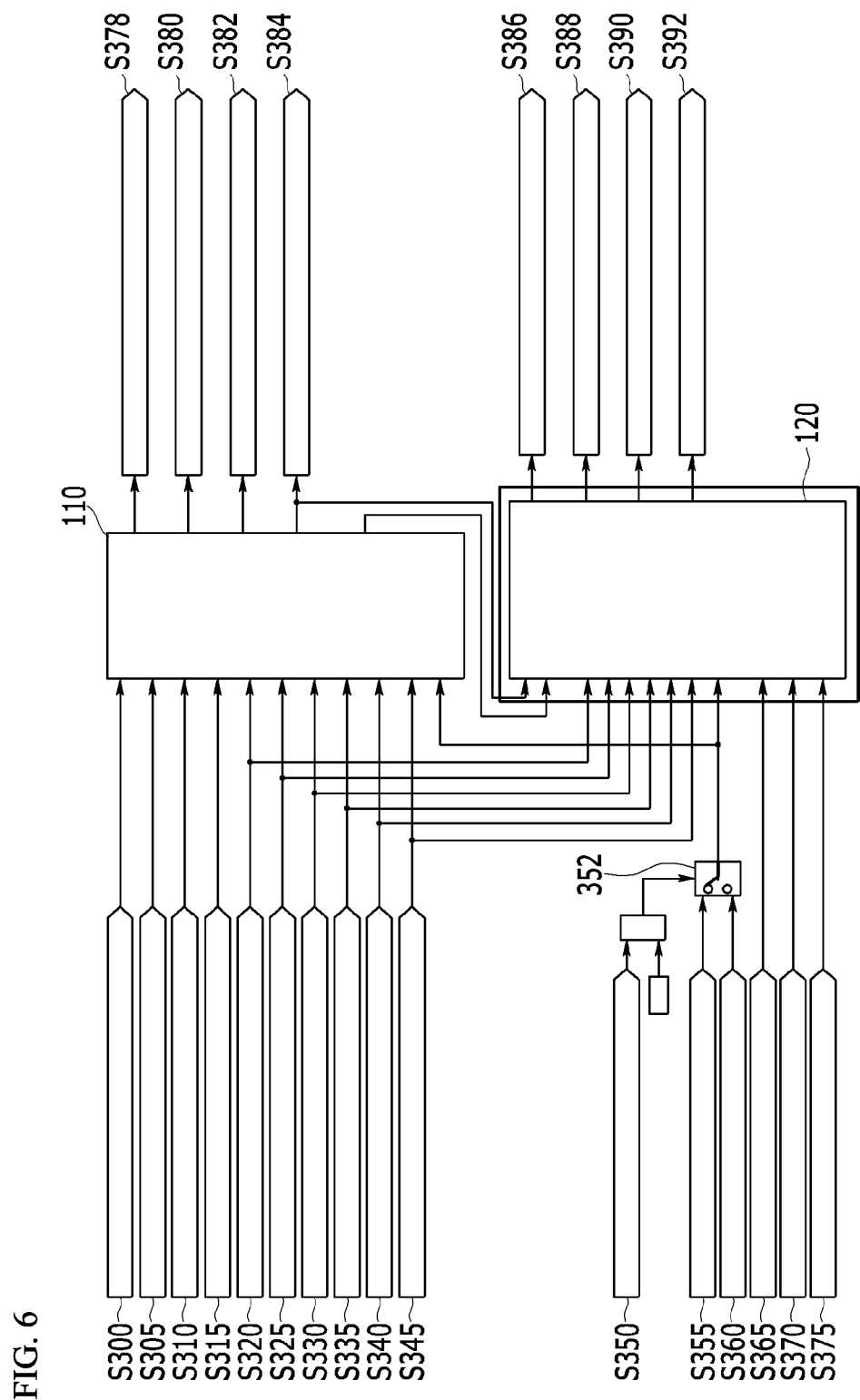

As shown in FIG. 6, the controller 70 calculates a maximum O2 adsorption of the LNT 40 (maximum O2 mass that can be adsorbed in the LNT), an O2 adsorption (O2 mass that is adsorbed in the LNT), a maximum NOx adsorption of the LNT 40 (maximum NOx mass that can be adsorbed in the LNT), and a NOx adsorption (NOx mass that is adsorbed in the LNT) at steps S300, S305, S310, and S345. The maximum O2 adsorption and the maximum NOx adsorption of the LNT 40 may be calculated from predetermined maps based on a volume of the LNT 40, an aging factor of the LNT 40, and so on, and the O2 adsorption and the NOx adsorption may be calculated from predetermined maps based on the temperature of the LNT 40, the aging factor of the LNT 40, the lambda at the upstream of the LNT 40 ($\lambda_{upstream}$), the lambda at the downstream of the LNT 40 ($\lambda_{downstream}$), and so on.

In addition, the controller 70 detects a current fuel injection (i.e., the fuel injection amount at a current cycle), an engine speed, and the lambda at the upstream of the LNT 40 ($\lambda_{upstream}$) at steps S320, S325, and S355. The current fuel injection is detected based on a signal that the controller 70 outputs to the injector 14, the engine speed is detected by a rotation speed sensor, and the lambda at the upstream of the LNT 40 ($\lambda_{upstream}$) is detected by the first oxygen sensor 72.

In addition, the controller 70 calculates a mass flow of the reductant (e.g., $C_3H_6$) other than the NH3 at the upstream of the i-th slice 40i, an aging factor of the i-th slice 40i, a mass flow of the exhaust gas passing through the i-th slice 40i, a temperature of the i-th slice 40i, a lambda at the upstream of the i-th slice 40i, and a NH3 mass flow at the upstream of the i-th slice 40i at steps S315, S330, S335, S340, S360, and S375. Herein, the aging factor of the i-th slice 40i, the mass flow of the exhaust gas passing through the i-th slice 40i, the temperature of the i-th slice 40i, and the lambda at the upstream of the i-th slice 40i may be calculated from predetermined maps based on the aging factor of the LNT 40, the mass flow of the exhaust gas passing through the LNT 40, the temperature of the LNT 40, the lambda at the upstream of the LNT 40, and so on. The mass flow of the reductant other than the NH3 at the upstream of the i-th slice 40i and the NH3 mass flow at the upstream of the i-th slice 40i may be calculated as the mass flow of the reductant other than the NH3 at the downstream of the (i−1)-th slice and the NH3 mass flow at the downstream of the (i−1)-th slice according to the exemplary embodiment of the present disclosure.

The controller 70 identifies a slice number (i) when executing the exemplary embodiment of the present disclosure at step S350, and determines which of the lambda at the upstream of the LNT 40 ($\lambda_{upstream}$) and the lambda at the upstream of the i-th slice 40i is used according to the slice number (i) at step 352.

In addition, the controller 70 calculates a rich progress rate and a NOx correction amount in regeneration at steps S365 and S370. Herein, the rich progress rate is defined as the following equation.

$$\text{Rich progress rate} = \frac{\frac{1 - \lambda_{downstream}}{\lambda_{upstream}}}{\frac{1 - \lambda_{target}}{\lambda_{target}}}$$

Herein, $\lambda_{target}$ is a target lambda, $\lambda_{upstream}$ is the lambda at the upstream of the LNT, and $\lambda_{downstream}$ is the lambda at the downstream of the LNT.

In addition, the NOx correction amount in regeneration is a corrected NOx mass adsorbed in the LNT 40 (corrected NOx adsorption in the LNT 40) when the LNT 40 is regenerated, and may be calculated from a predetermined map based on the rich progress rate, the temperature of the LNT 40, the lambda at the upstream of the LNT 40 ($\lambda_{upstream}$), the aging factor of the LNT 40, and so on.

As described above, if necessary data is detected or calculated, the controller 70 inputs the data into a reductant model 110 and a NH3 generation/usage model 120 so as to calculate the mass flow of the reductant other than the NH3 at the downstream of the i-th slice 40i, a mass flow of the reductant other than NH3 used to reduce O2 at the i-th slice 40i, a mass flow of the used reductant other than NH3, a mass flow of the reductant other than NH3 used to reduce the NOx at the i-th slice 40i, a NH3 generation coefficient at the i-th slice 40i, a NH3 mass flow at the downstream of the i-th slice 40i, a NH3 mass flow used to reduce the NOx at the i-th slice 40i, and a NH3 mass flow used to reduce the O2 at the i-th slice 40i at steps S378, S380, S382, S384, S386, S388, S390, and S392. The reductant model 110 and the NH3 generation/usage model 120 are stored in a memory of the controller 70 or a memory operably connected to the controller 70.

Herein, the reductant model 110 may be produced based on the following equations.

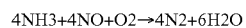

$$C3H6 + 2NO2 + O2 \rightarrow 2NH3 + 3CO2$$

$$C3H6 + 4.5NO2 \rightarrow 2.25N2 + 3CO2 + 3H2O$$

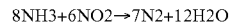

$$C3H6 + 4.5O2 \rightarrow 3CO2 + 3H2O$$

In addition, reaction coefficients that are ratios of mass flows of C3H6 participating in respective reactions to a mass flow of C3H6 participating in all the reactions according to the temperature of the LNT 40, the NOx mass adsorbed in the LNT 40, the lambda at the upstream of the LNT 40 ($\lambda_{upstream}$), and the rich progress rate are stored in the reductant model 110. Therefore, a mass flow of the C3H6 used to reduce the O2 and a mass flow of the C3H6 used to reduce the NOx may be calculated on the basis of the mass flow of the C3H6 participating in the reactions, the reaction coefficients, and molar masses of the C3H6, the NO2, the O2, the N2, the NH3, and the H2O. In addition, a NH3 mass flow generated from the C3H6 is also calculated.

It is exemplified in this specification that the C3H6 represents all reductants besides the NH3 as a kind of substitute reductant and all NOx are represented by NO2. From a number of experiment results, it may be confirmed that a suitable result is produced though a reaction model where the C3H6 is used as a kind of substitute reductants (besides NH3) and all NOx are represented by the NO2. Even though a reductant type and a NOx type are restricted, all components are represented and calculated correctly within the reaction model. Therefore, the reaction model may be simplified and a capacity of the memory in which the reaction model is stored may be reduced.

In addition, the NH3 generation/usage model 120 may be produced based on the following equations.

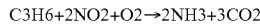

$$4NH3 + 4NO + O2 \rightarrow 4N2 + 6H2O$$

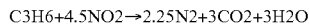

$$2NH3 + NO + NO2 \rightarrow 2N2 + 3H2O$$

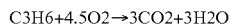

$$8NH3 + 6NO2 \rightarrow 7N2 + 12H2O$$

Hereinafter, referring to FIG. 7 to FIG. 10, the steps illustrated in FIG. 6 will be described in further detail.

Figure 7:
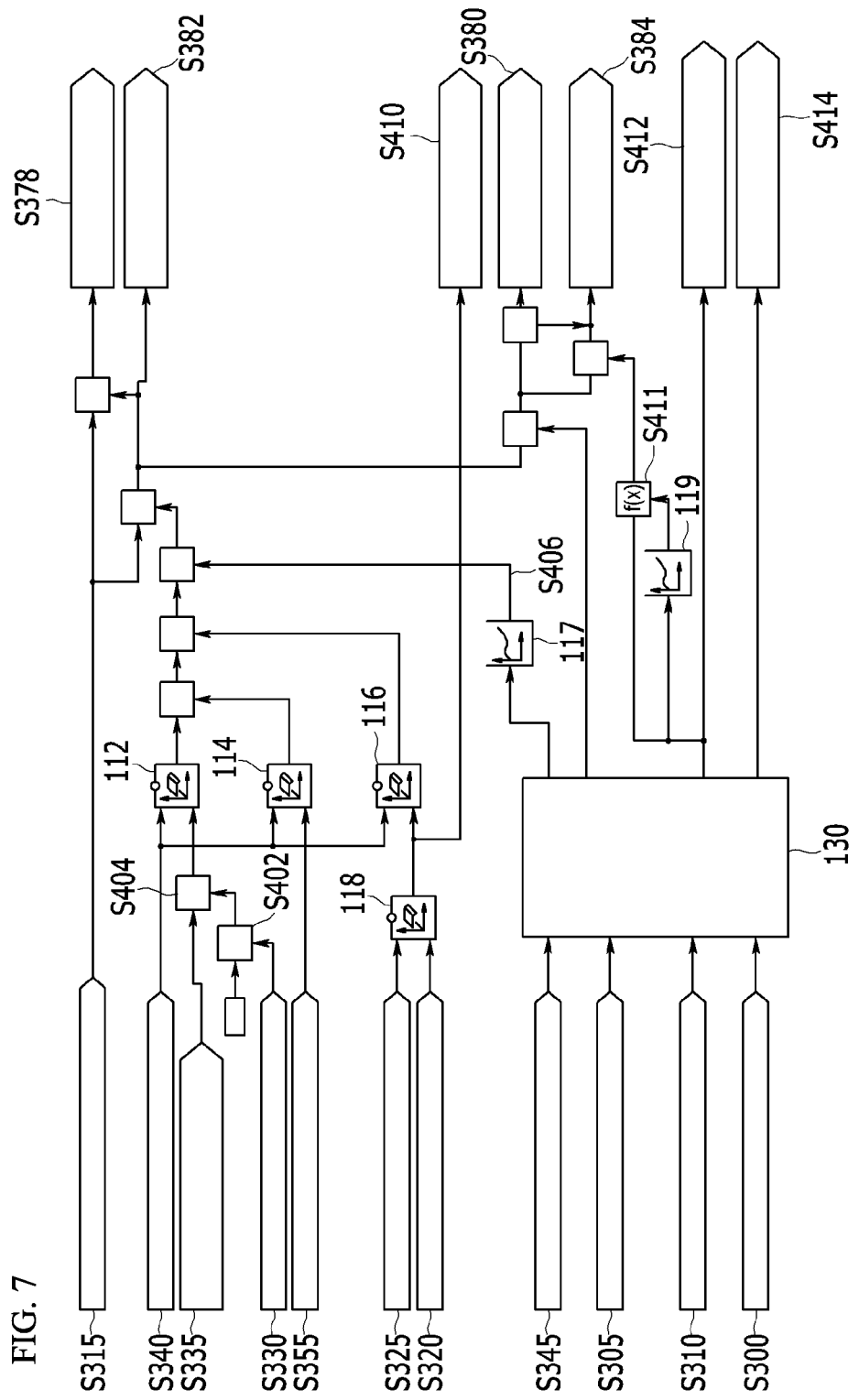

As shown in FIG. 7, the controller 70 may calculate an efficient volume coefficient of the i-th slice 40i based on the aging factor of the i-th slice 40i at step S402, and correct an exhaust mass flow of the i-th slice 40i using the efficient volume coefficient at step S404. After that, the controller 70 inputs the corrected exhaust mass flow of the i-th slice 40i and the temperature of the i-th slice 40i into a C3H6 base efficiency map 112 so as to calculate a C3H6 base efficiency.

In addition, the controller 70 inputs the temperature of the i-th slice 40i and the lambda at the upstream of the LNT 40 into a first correction map 114 so as to calculate a first correction coefficient, inputs the engine speed and the fuel injection amount into a predetermined map 118 so as to calculate a CO/HC of the used reductant other than NH3 at step S410, and inputs the temperature of the i-th slice 40i and the CO/HC into a second correction map 116 so as to calculate a second correction coefficient.

In addition, the controller 70 inputs the NOx adsorption, the O2 adsorption, and the maximum NOx adsorption and the maximum O2 adsorption of the LNT 40 into a predetermined map 130 so as to calculate a relative O2 and NOx molar adsorption (it is calculated by dividing a total of O2 and NOx molar adsorption by a total of the maximum O2 and NOx molar adsorption), and inputs the relative O2 and NOx molar adsorption into a third correction map 117 so as to calculate a third correction coefficient.

After that, the controller 70 calculates a used C3H6 mass flow at the i-th slice 40i by using the C3H6 mass flow at the upstream of the i-th slice 40i, the C3H6 base efficiency, and the first, second, and third correction coefficients at step S382. In addition, the controller 70 calculates a C3H6 mass flow at the downstream of the i-th slice 40i by using the C3H6 mass flow at the upstream of the i-th slice 40i and the used C3H6 mass flow at the i-th slice 40i at step S378.

In addition, the controller 70 calculates a ratio of the adsorbed O2 and NOx (a ratio of mole number of the adsorbed O2 and mole number of the adsorbed NOx) and a ratio of the NOx adsorption at the i-th slice 40i to the NOx adsorption in the LNT 40 (a ratio of molar number of the NOx adsorbed at the i-th slice to molar number of the NOx adsorbed in the LNT) at steps S412 and S414 by inputting the NOx adsorption, the O2 adsorption, the maximum NOx adsorption of the LNT 40, and the maximum O2 adsorption of the LNT 40 into a predetermined map 130.

Further, the controller 70 calculates a reaction ratio by inputting the ratio of the adsorbed O2 and NOx into a predetermined reaction map 119 at step S411, and calculates a C3H6 mass flow used to reduce the O2 and a C3H6 mass flow used to reduce the NOx at steps S380 and S384 by using the ratio of the adsorbed O2 and NOx, the reaction ratio, and the used C3H6 mass flow at the i-th slice 40i.

Figure 8:
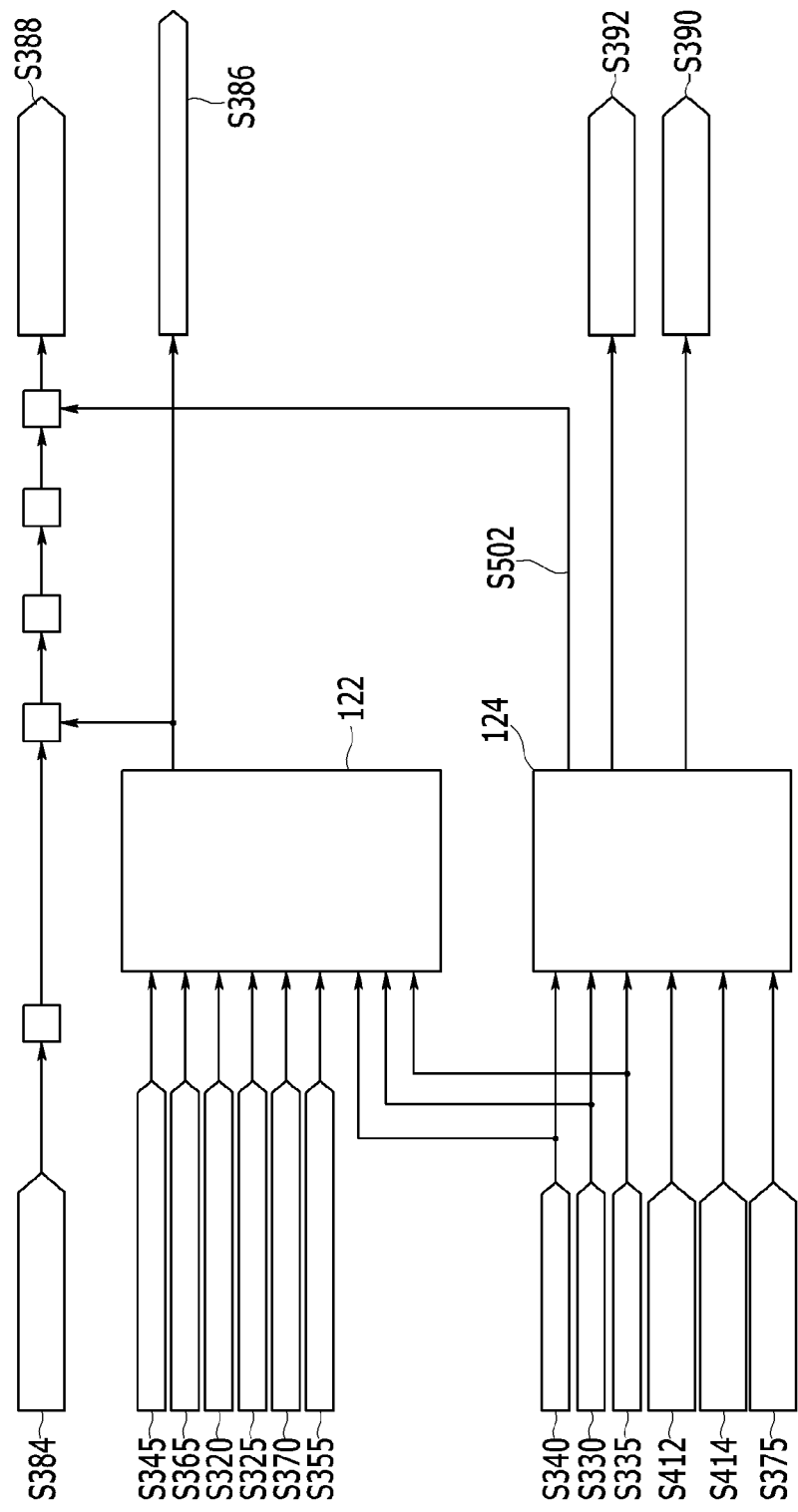

After that, the controller 70, as shown in FIG. 8, calculates the NH3 generation coefficient, the NH3 mass flow used to reduce O2 at the i-th slice 40i, the NH3 mass flow used to reduce NOx at the i-th slice 40i, the NH3 mass flow that is not used at the i-th slice 40i at steps S386, S392, S390, and S388 by inputting the NOx adsorption, the rich progress rate, the fuel injection amount, the engine speed, the NOx correction amount in regeneration, the lambda at the upstream of the LNT 40, the temperature of the i-th slice 40i, the aging factor of the i-th slice 40i, the mass flow of the exhaust gas passing through the i-th slice 40i, the ratio of the adsorbed O2 and NOx, the ratio of the NOx adsorption at the i-th slice 40i to the NOx adsorption in the LNT 40, and the NH3 mass flow at the upstream of the i-th slice 40i into a NH3 generation model 122 and a NH3 usage model 124. The NH3 generation model 122 and the NH3 usage model 124 may be stored in a memory of the controller 70 or a memory operably connected to the controller 70.

In addition, the controller 70 calculates the NH3 mass flow at the downstream of the i-th slice 40i at step S388 on the basis of the C3H6 mass flow used to reduce the NOx at the i-th slice 40i, the NH3 generation coefficient, and the NH3 mass flow that is not used at the i-th slice 40i.

Hereinafter, referring to FIG. 9 and FIG. 10, the steps illustrated in FIG. 8 will be described in further detail.

Figure 9:
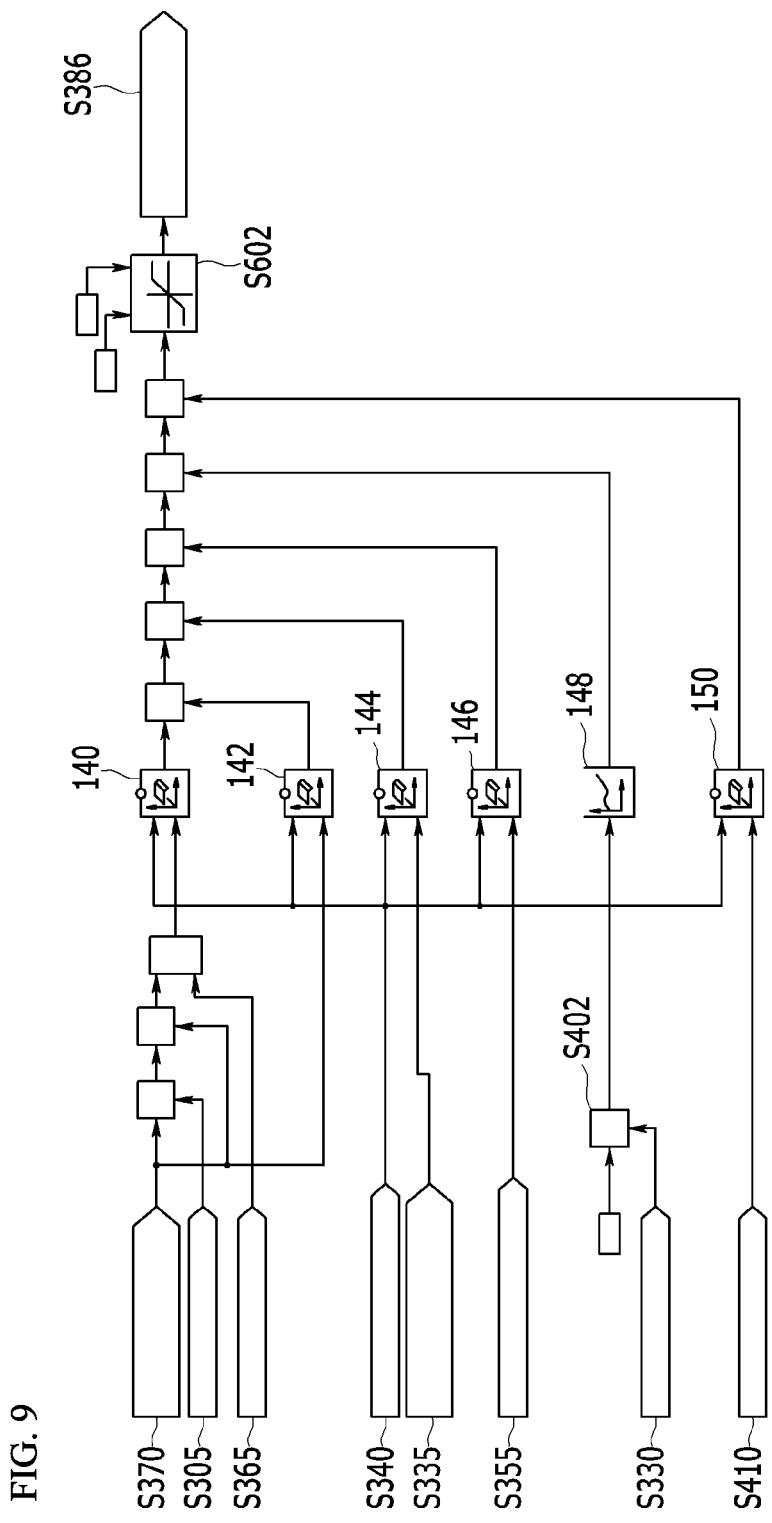

As shown in FIG. 9, the controller 70 calculates a predicted rich progress rate on the basis of the NOx correction amount in regeneration and the O2 adsorption, and calculates the maximum value of the predicted rich progress rate and the rich progress rate as a final rich progress rate. On the contrary, the rich progress rate that is calculated as above or a rich progress rate that is calculated through a different way may be used as the final rich progress rate. Herein, the reason why the rich progress rate is used is that the NH3 is not generated in an initial stage of regeneration but is generated in a middle stage of regeneration. Therefore, the rich progress rate is used to precisely calculate a NH3 generation amount.

The controller 70 calculates a base NH3 generation coefficient by inputting the temperature of the i-th slice 40i and the rich progress rate into a base NH3 generation map 140. In addition, the controller 70 calculates a fourth correction coefficient by inputting the NOx adsorption and the temperature of the i-th slice 40i into a fourth correction map 142, calculates a fifth correction coefficient by inputting the temperature of the i-th slice 40i and the mass flow of the exhaust gas passing through the i-th slice 40i into a fifth correction map 144, calculates a sixth correction coefficient by inputting the lambda at the upstream of the LNT 40 and the temperature of the i-th slice 40i into a sixth correction map 146, a seventh correction coefficient by inputting the efficient volume coefficient of the i-th slice 40i calculated according to the aging factor of the i-th slice 40i at step S402 into a seventh correction map 148, and calculates an eighth correction coefficient by inputting the CO/HC of the used reductant other than NH3 into an eighth correction map 150.

After that, the controller 70 calculates a temporary NH3 generation coefficient using the base NH3 generation coefficient and the fourth, fifth, sixth, seventh, and eighth correction coefficients, and calculates a final NH3 generation coefficient at step S386 by comparing the temporary NH3 generation coefficient with a maximum value and a minimum value at step S602.

In addition, the controller 70 calculates the NH3 mass flow generated at the i-th slice 40i on the basis of the mass flow of the reductant other than NH3 that is used to reduce the NOx at the i-th slice 40i and the NH3 generation coefficient at the i-th slice 40i.

Figure 10:
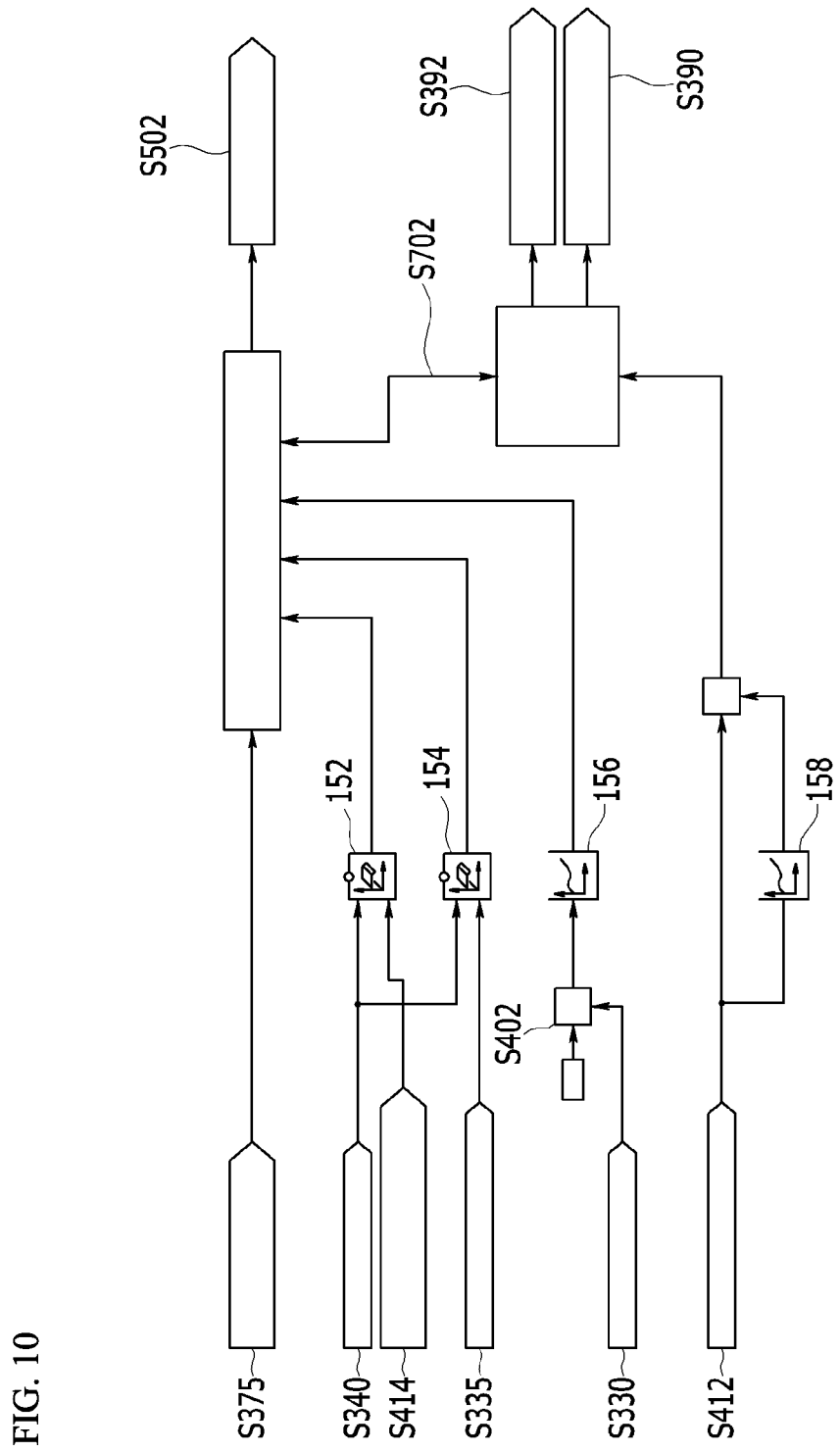

As shown in FIG. 10, the controller 70 calculates a NH3 usage ratio at the i-th slice 40i by inputting the temperature of the i-th slice 40i and the ratio of the NOx adsorption at the i-th slice 40i to the NOx adsorption in the LNT 40 into a NH3 usage ratio map 152.

In addition, the controller 70 calculates a ninth correction coefficient by inputting the temperature of the i-th slice 40i and the mass flow of the exhaust gas passing through the i-th slice 40i into a ninth correction map 154, calculates a tenth correction coefficient by inputting the aging factor of the i-th slice 40i and the efficient volume coefficient of the i-th slice 40i (that is calculated at the step S402) into a tenth correction map 156, and calculates an eleventh correction coefficient by inputting the ratio of the adsorbed O2 and NOx into an eleventh correction map 158.

After that, the controller 70 calculates a twelfth correction coefficient by multiplying the eleventh correction coefficient and the ratio of the adsorbed O2 and NOx.

The controller 70 calculates the NH3 mass flow that is not used at the i-th slice 40i and the NH3 mass flow that is used at the i-th slice 40i at steps S502 and S702 by using the NH3 mass flow at the upstream of the i-th slice 40i, the NH3 usage ratio of the i-th slice 40i, and the ninth and tenth correction coefficients.

After that, the controller 70 calculates the NH3 mass flow used to reduce the O2 and the NH3 mass flow used to reduce the NOx at the i-th slice 40i at steps S392 and S390 by using the NH3 mass flow that is used at the i-th slice 40i and the twelfth correction coefficient.

After that, the controller 70 calculates the NH3 mass flow at the downstream of the i-th slice 40i by adding the NH3 mass flow generated at the i-th slice 40i to the value obtained by subtracting the NH3 mass flow used in the reduction reaction at the i-th slice 40i from the NH3 mass flow flowing into the i-th slice 40i (the NH3 mass flow at the upstream of the i-th slice 40i). In addition, the NH3 mass flow at the downstream of the i-th slice 40i is the same as the NH3 mass flow at the upstream of the (i+1)-th slice.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A method of calculating an ammonia (NH3) mass generated from an engine exhaust gas in a lean NOx trap (LNT) of an exhaust purification device by a controller, wherein the LNT is divided into n slices along a flow of an exhaust gas, and the engine is controlled by the controller to burn mixture of air and fuel and generate and supply the exhaust gas to the LNT, the method comprising:
sequentially calculating a NH3 mass flow included in the exhaust gas at a downstream of each slice from a first slice to an n-th slice; and
integrating the NH3 mass flow at the downstream of the n-th slice over a predetermined time,
wherein the calculation of the NH3 mass flow at the downstream of the i-th slice comprises:
calculating a NH3 mass flow flowing into the i-th slice using the controller;
calculating a NH3 mass flow used to reduce NOx and O2 at the i-th slice using the controller;
calculating a NH3 mass flow generated at the i-th slice using the controller; and
adding the NH3 mass flow generated at the i-th slice to a value obtained by subtracting the NH3 mass flow used to reduce the NOx and the O2 at the i-th slice from the NH3 mass flow flowing into the i-th slice using the controller.

2. The method of claim 1, wherein the NH3 mass flow flowing into the i-th slice is the NH3 mass flow at the downstream of the (i−1)-th slice.

3. The method of claim 1, wherein the calculation of the NH3 mass flow used to reduce the NOx and the O2 at the i-th slice comprises:
calculating the NH3 mass flow at an upstream of the i-th slice;
calculating a NH3 usage ratio according to a temperature of the i-th slice and a ratio of a NOx adsorption at the i-th slice to a NOx adsorption at the LNT;
calculating a correction coefficient according to the temperature of the i-th slice and a mass flow of the exhaust gas passing through the i-th slice;
calculating a correction coefficient according to an aging factor of the i-th slice;
calculating a correction coefficient according to a ratio of the adsorbed O2 and NOx; and
calculating a NH3 mass flow used to reduce the NOx and a NH3 mass flow used to reduce the O2 at the i-th slice on the basis of the NH3 mass flow at the upstream of the i-th slice, the NH3 usage ratio according to the temperature of the i-th slice and the ratio of the NOx adsorption at the i-th slice to the NOx adsorption at the LNT, the correction coefficient according to the temperature of the i-th slice and the mass flow of the exhaust gas passing through the i-th slice, the correction coefficient according to the aging factor of the i-th slice, and the correction coefficient according to the ratio of the adsorbed O2 and NOx.

4. The method of claim 1, wherein the step of calculating the NH3 mass flow generated at the i-th slice comprises:
calculating a mass flow of a reductant other than NH3 used to reduce the NOx at the i-th slice;
calculating a NH3 generation coefficient at the i-th slice; and
calculating the NH3 mass flow generated at the i-th slice on the basis of the mass flow of the reductant other than the NH3 used to reduce the NOx at the i-th slice and the NH3 generation coefficient at the i-th slice.

5. The method of claim 4, wherein the step of calculating the NH3 generation coefficient at the i-th slice comprises:
calculating a base NH3 generation coefficient on the basis of a rich progress rate and the temperature of the i-th slice;
calculating a correction coefficient according to a NOx adsorption and the temperature of the i-th slice;
calculating a correction coefficient according to the temperature of the i-th slice and the mass flow of the exhaust gas passing through the i-th slice;
calculating a correction coefficient according to a lambda at an upstream of the LNT and the temperature of the i-th slice;
calculating a correction coefficient according to the aging factor of the i-th slice;
calculating a correction coefficient according to a ratio of CO and HC contained in the reductant other than the NH3; and
calculating a corrected NH3 generation coefficient at the i-th slice on the basis of the base NH3 generation coefficient according to the rich progress rate and the temperature of the i-th slice, the correction coefficient according to the NOx adsorption and the temperature of the i-th slice, the correction coefficient according to the temperature of the i-th slice and the mass flow of the exhaust gas passing through the i-th slice, the correction coefficient according to the lambda at the upstream of the LNT and the temperature of the i-th slice, the correction coefficient according to the aging factor of the i-th slice, and the correction coefficient according to the ratio of CO and HC contained in the reductant other than the NH3.

6. The method of claim 5, wherein the rich progress rate is defined as an equation of $$\frac{\frac{1-\lambda_{downstream}}{\lambda_{upstream}}}{\frac{1-\lambda_{target}}{\lambda_{target}}},$$

wherein, $\lambda_{target}$ is a target lambda, $\lambda_{upstream}$ is the lambda at the upstream of the LNT, and $\lambda_{downstream}$ is a lambda at a downstream of the LNT.

7. The method of claim 4, wherein the mass flow of the reductant other than the NH3 used to reduce the NOx at the i-th slice is calculated through a model where C3H6 represents all reductant besides the NH3 as a kind of substitute reductant.

8. An exhaust purification device, comprising:
an engine including an injector for injecting fuel thereinto, generating power by burning a mixture of air and the fuel, and exhausting the exhaust gas generated during a combustion process to the exterior thereof through an exhaust pipe;
a lean NOx trap (LNT) mounted on the exhaust pipe, for adsorbing nitrogen oxide (NOx) contained in the exhaust gas at a lean air/fuel ratio, releasing the adsorbed nitrogen oxide at a rich air/fuel ratio, and reducing the nitrogen oxide contained in the exhaust gas or the released nitrogen oxide using reductant including carbon or hydrogen contained in the exhaust gas; and
a controller for controlling adsorption and release of the NOx by controlling an air/fuel ratio according to the NOx adsorbed in the LNT and a temperature of the exhaust gas,
wherein the LNT is divided into n slices along a flow of the exhaust gas, and
wherein the controller sequentially calculates a NH3 mass flow at a downstream of each slice from a first slice to an n-th slice, and calculates a NH3 mass generated in the LNT by integrating the NH3 mass flow at the downstream of the n-th slice over a predetermined time, wherein the controller calculates a NH3 mass flow flowing into the i-th slice, a NH3 mass flow used to reduce NOx and O2 at the i-th slice, and a NH3 mass flow generated at the i-th slice, and calculates the NH3 mass flow at the downstream of the i-th slice by adding the NH3 mass flow generated at the i-th slice to a value obtained by subtracting the NH3 mass flow used to reduce the NOx and the O2 at the i-th slice from the NH3 mass flow flowing into the i-th slice.

9. The exhaust purification device of claim 8, wherein the controller calculates the NH3 mass flow at the downstream of the (i−1)-th slice as the NH3 mass flow flowing into the i-th slice.

10. The exhaust purification device of claim 8, wherein the controller calculates the NH3 mass flow used to reduce the NOx and the NH3 mass flow used to reduce the O2 at the i-th slice on the basis of a NH3 mass flow at an upstream of the i-th slice, a NH3 usage ratio according to a temperature of the i-th slice and a ratio of a NOx adsorption at the i-th slice to a NOx adsorption at the LNT, a correction coefficient according to the temperature of the i-th slice and a mass flow of the exhaust gas passing through the i-th slice, a correction coefficient according to an aging factor of the i-th slice, and a correction coefficient according to a ratio of adsorbed O2 and NOx.

11. The exhaust purification device of claim 8, wherein the controller calculates the NH3 mass flow generated at the i-th slice on the basis of a mass flow of a reductant other than the NH3 used to reduce the NOx at the i-th slice and a NH3 generation coefficient at the i-th slice.

12. The exhaust purification device of claim 11, wherein the controller calculates a corrected NH3 generation coefficient at the i-th slice on the basis of a base NH3 generation coefficient according to the rich progress rate and the temperature of the i-th slice, a correction coefficient according to a NOx adsorption and the temperature of the i-th slice, a correction coefficient according to the temperature of the i-th slice and the mass flow of the exhaust gas passing through the i-th slice, a correction coefficient according to a lambda at an upstream of the LNT and the temperature of the i-th slice, a correction coefficient according to an aging factor of the i-th slice, and a correction coefficient according to a ratio of CO and HC contained in the reductant other than NH3.

13. The exhaust purification device of claim 12, wherein the rich progress rate is defined as an equation of $$\frac{\frac{1-\lambda_{downstream}}{\lambda_{upstream}}}{\frac{1-\lambda_{target}}{\lambda_{target}}},$$

wherein $\lambda_{target}$ is a target lambda, $\lambda_{upstream}$ is the lambda at the upstream of the LNT, and $\lambda_{downstream}$ is a lambda at a downstream of the LNT.

14. The exhaust purification device according to claim 11, wherein the controller calculates the mass flow of the reductant other than the NH3 used to reduce the NOx at the i-th slice through a model where C3H6 represents all reductant besides NH3 as a kind of substitute reductant.

15. The exhaust purification device of claim 8, further comprising:
a dosing module mounted at the exhaust pipe downstream of the LNT for directly injecting a reducing agent into the exhaust gas; and
a selective catalytic reduction (SCR) catalyst mounted at the exhaust pipe downstream of the dosing module for reducing the NOx contained in the exhaust gas by using the reducing agent injected by the dosing module,
wherein the controller controls an amount of the reducing agent injected by the dosing module according to a NOx mass flow flowing into the SCR catalyst, and
wherein the controller controls the amount of the reducing agent injected by the dosing module considering the NH3 mass generated at the LNT.

* * * * *